Figure 1:
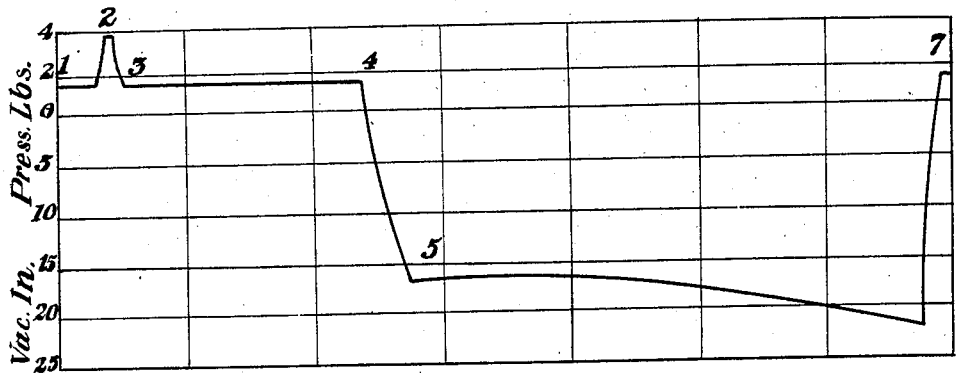

Aug. 23, 1927.

1,639,957

C. O. NORTH
MANUFACTURE OF ALDEHYDE REACTION PRODUCTS OF THE
ALDEHYDE DERIVATIVE OF A SCHIFF'S BASE
Filed March 25, 1925

INVENTOR.
Clayton O. North
BY
R.L. Sibley ATTORNEYS.

Patented Aug. 23, 1927.

1,639,957

UNITED STATES PATENT OFFICE.

CLAYTON OLIN NORTH, OF TALLMADGE TOWNSHIP, SUMMIT COUNTY, OHIO, ASSIGNOR TO THE RUBBER SERVICE LABORATORIES CO., OF AKRON, OHIO, A CORPORATION OF OHIO.

MANUFACTURE OF ALDEHYDE REACTION PRODUCTS OF THE ALDEHYDE DERIVATIVE OF A SCHIFF'S BASE.

Application filed March 25, 1925. Serial No. 18,316.

The present invention is directed to the art of manufacturing reaction products of aldehydes and amines and is particularly directed to methods of preparing compounds having great commercial value and use as accelerators of the vulcanization of rubber.

It has been known for many years that aldehydes and amines will react more or less readily with one another to produce compounds known in chemistry as Schiff's bases. Such substances are produced by the condensation of equal molecular proportions of the interacting substances. I have earlier observed that a Schiff's base may be combined with an additional quantity of an aldehyde to produce compounds wherein in the case of one such product, the sum total of the reactions taking place is found to comprise the union of three molecular proportions of the aldehyde with two molecular proportions of the amine. The preparation of such compounds, which I term the aldehyde derivatives of Schiff's bases is fully described and claimed in my co-pending application, Serial No. 627,326 filed March 24, 1923.

I have also further observed, as described and claimed in another co-pending application, Serial No. 627,325 also filed March 24, 1923, that the compounds last mentioned may be further reacted and combined with an additional quantity of the same or a different aldehyde than that first used, to produce compounds which I have termed the aldehyde reaction product of the aldehyde derivative of a Schiff's base. By this last reaction, a comparatively soft, easily plasticized product is made much harder and more resin-like so that it may be ground and sifted.

My present invention is a continuation in part of this last mentioned application and is directed particularly to a process of preparing these last named hard, resinous as well as other similarly constituted materials under carefully controlled and regulable conditions while employing certain definite proportions of the necessary ingredients as is hereinafter disclosed. It is, of course, possible to react an aldehyde derivative of a Schiff's base with such an excess of aldehyde that no further quantity of aldehyde will react or combine therewith, but it is often desirable to manufacture some one of the many intermediate condensation and reaction products possible and it is an object of the present invention to provide a process whereby this may be done.

As an example of one method of operating my invention I first prepare an aldehyde derivative of a Schiff's base according to the process described in my application, Serial No. 627,326 hereinbefore referred to. According to the process therein disclosed, an aliphatic aldehyde, such as acetaldehyde is vaporized, and the vapor passed through an aromatic primary amine, such as aniline, contained in a plurality of closed reaction vessels connected in series. The aldehyde combines for the most part with the amine in the first reaction vessel and as the combination proceeds, the contents of the reaction vessel become appreciably heated by the heat evolved in the reaction taking place. The flow of aldehyde vapor is continued until the contents of the first reaction vessel have become heated to their maximum temperature and are then allowed gradually to cool down as the reaction in the first reaction vessel subsides but the flow of aldehyde vapor is continued through the first vessel during the period while the reaction is proceeding in the second vessel. The contents of the first reaction vessel are then drawn off and this reaction product which I term the acetaldehyde derivative of ethylidene aniline and which comprises the union of three molecular proportions of acetaldehyde with two molecular proportions of aniline, is dehydrated at a temperature between 100° to 115° centigrade until the moisture content is no more than 2% by weight of the compound. I then place 693 parts by weight of this dehydrated material in a steam jacketed kettle or reaction chamber and add thereto 307 parts by weight of 40% formaldehyde solution (by volume or a 37 to 38% solution by weight) or 171 parts by weight of acetaldehyde or a polymer thereof, or an equivalent proportion of other aldehyde. The reaction chamber is then tightly closed and is connected with suitable cooling means to condense and return by a refluxing action to the chamber any aldehyde vapors evolved therefrom. Steam is then turned into the jacket of the container and the temperature of the mixture increased to approximately 80° centigrade at which point reaction takes place rapidly. Inasmuch as quantities of heat are evolved in the reaction, the temperature of the mixture increases to approximately 100° centigrade and is maintained at that point by flowing cooling or heating means through the jacket as needed.

As soon as the reaction begins to subside in speed and violence, the temperature begins gradually to fall but is maintained at approximately 95° C. by flowing steam through the jacket for a period of approximately four hours in order to allow the reaction to go to completion. Inasmuch as the temperature employed is above the boiling point of the aldehyde and as the reacting mixture boils more or less violently, thorough agitation of the mixture is caused but additional mechanical stirring means may be provided, if desired.

Figure 2:
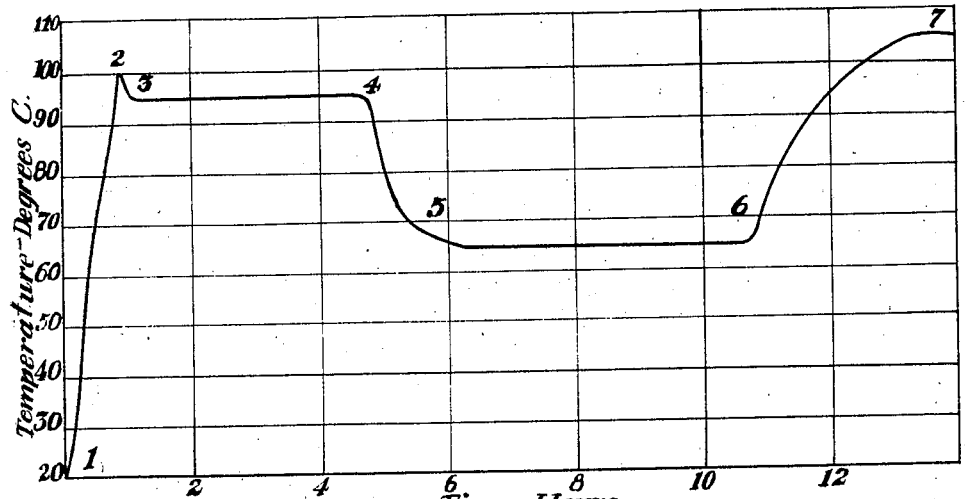

The course of the reaction and the indications shown thereby as necessary for its control are evident by reference to the drawings in which Figure 1 is a chart of the pressure relationship in regard to time and Figure 2 is a similar chart of the temperature relationship in regard to time. Like reference numbers refer to the same reaction periods in the respective charts. Referring to these drawings, it is seen that during the first stages of the reaction a slight pressure is built up at the maximum temperature reached (points 2, 2, of Figs. 1 and 2.) The pressure indicated by the points 1, 3, 4 of Fig. 1, is caused by the interposition of a suitable seal or trap between the still and reflux condenser. This pressure is slightly greater than that built up in the chamber by the vapors produced in the reaction taking place and is necessary to prevent the escape of vapors from the reaction zone.

After the reacting mixture has been maintained for approximately four hours at a temperature of approximately 95° centigrade, the condensers are changed so that a refluxing of the condensate is no longer produced but in place thereof a straight condensation and removal from the mass of all residual volatile substances. At the same time, as is indicated in Fig. 1, a vacuum is placed on the still as is shown at the points 4, 5 of the drawings. This vacuum is gradually increased to slightly more than 15 inches and is held approximately at that point or somewhat higher for a period of four to six hours and the temperature is maintained sufficiently high to remove the major portion of the water present. At the end of this time, the moisture content of the material in the kettle has been reduced to not more than 2% by weight of the product. As indicated in Fig. 2, the temperature of the product during this drying step is preferably not allowed to go higher than 110° C. At the point indicated, the vacuum line to the kettle is shut off, the vacuum in the still is thereby broken and the product in a molten condition is withdrawn from the chamber, flowed into cooling pans and when cold, is crushed and ground to any degree of fineness desired.

By operating under the conditions described and employing the proportions of ingredients indicated, there is obtained a product wherein the aldehyde derivative of a Schiff's base has been further combined with from 16.8% to not more than 20% by weight of formaldehyde or other aldehyde. The relative hardness of the final product has been found to vary with the quantity of aldehyde combined with the material in the process described. For this reason, the quantity of aldehyde taken for the reaction and the period during which the reaction is allowed to continue are suitably chosen so as to yield any one of the products desired. Thus, for example, if a derivative be desired possessing a greater proportion of aldehyde than the one described, a larger quantity of aldehyde may be added to the reaction chamber and the reaction maintained at an interacting temperature for a longer period of time than the four hours mentioned in the example given.

It is to be understood that the example given is illustrative only and not limitative of my invention. Thus, in place of the aniline mentioned, I may use the toluidines, the xylidines or other of the primary aromatic amines while in place of the acetaldehyde and formaldehyde mentioned, I may use other aliphatic aldehydes such as propionaldehyde, butraldehyde or unsaturated aldehydes such as crotonaldehyde and the like. The aldehydes may also, if desired be used in their more or less solid polymeric forms. Moreover, it is not at all necessary that the same aldehyde be used in all the stages of the reaction. I may, for example, prepare a Schiff's base by the use of one aldehyde on an amine, then employ a different aldehyde for the preparation of the aldehyde derivative thereof and then use a third aldehyde, or one of the two aldehydes already employed, or if desired, a mixture of a plurality of aldehydes for the preparation of the aldehyde reaction product of the aldehyde derivative of a Schiff's base. It is, then possible to use any combination of materials as desired.

It is furthermore to be understood that my invention is not limited by any theories advanced by way of explanation of the reactions taking place but is limited solely by the following claims appended hereto and made a part of this specification and in which I intend to claim all novelty inherent in my invention as permitted in view of the prior art.

What I claim is:

1. The process of preparing the aldehyde reaction product of an aldehyde derivative of a Schiff's base, which comprises combining the substantially dehydrated aliphatic aldehyde derivative of a Schiff's base with from 16.8 to 20% by weight of an aliphatic aldehyde.

2. The process of preparing the aldehyde reaction product of an aldehyde derivative of a Schiff's base, which comprises combining the substantially dehydrated aliphatic aldehyde derivative of a Schiff's base with approximately 16.8% by weight of an aliphatic aldehyde.

3. The process of preparing the aldehyde reaction product of an aldehyde derivative of ethylidene aniline, which comprises combining the substantially dehydrated aliphatic aldehyde derivative of ethylidene aniline with from 16.8 to 20% by weight of an aliphatic aldehyde.

4. The process of preparing the formaldehyde reaction product of an acetaldehyde derivative of ethylidene aniline which comprises combining the substantially dehydrated acetaldehyde derivative of ethylidene aniline with approximately 16.8 parts by weight of formaldehyde.

5. The process of preparing the formaldehyde reaction product of the compound formed by the union of three molecular proportions of acetaldehyde with two molecular proportions of aniline, which comprises combining said substantially dehydrated compound with approximately 16.8 parts by weight of formaldehyde.

6. The aldehyde reaction product of a substantially dehydrated aliphatic aldehyde derivative of a Schiff's base, prepared by combining said derivative with from 16.8 to 20% by weight of a further quantity of an aliphatic aldehyde.

7. The formaldehyde reaction product of the substantially dehydrated acetaldehyde derivative of ethylidene aniline, prepared by combining said derivative with approximately 16.8% by weight of formaldehyde.

In testimony whereof I affix my signature.

CLAYTON OLIN NORTH.